United States Patent
Eventoff

[11] Patent Number: 5,553,513
[45] Date of Patent: Sep. 10, 1996

[54] MECHANICAL MOTION TRANSFER OR INDEXING DEVICE

[75] Inventor: Arnold T. Eventoff, Pleasantville, N.Y.

[73] Assignee: Pitney Bowes Inc., Stamford, Conn.

[21] Appl. No.: 409,382

[22] Filed: Mar. 23, 1995

[51] Int. Cl.$^6$ .......................... F16H 53/08; F16H 27/04; F16H 35/02
[52] U.S. Cl. .................. 74/569; 74/63; 74/84 R
[58] Field of Search .................... 74/63, 84 R, 569, 74/125

[56] References Cited

U.S. PATENT DOCUMENTS

| | | | |
|---|---|---|---|
| 2,618,196 | 11/1952 | Mitchell | 74/125 X |
| 2,649,836 | 8/1953 | Clapp | 74/84 X |
| 3,116,923 | 1/1964 | Gunther | 74/569 X |
| 4,266,222 | 5/1981 | Eckert et al. | 340/679 |
| 4,302,821 | 11/1981 | Eckert et al. | 364/900 |
| 4,774,446 | 9/1988 | Salazar et al. | 318/561 |
| 4,864,505 | 9/1989 | Miller et al. | 364/464.02 |
| 4,933,616 | 6/1990 | Chang et al. | 318/561 |
| 5,224,416 | 7/1993 | Malin et al. | 101/91 |
| 5,251,554 | 10/1993 | Eckert, Jr. et al. | 101/91 |
| 5,355,068 | 10/1994 | Eckert, Jr. et al. | 348/282 |

OTHER PUBLICATIONS

"Automated Cam–Mechanism Synthesis And Analysis" By: Arnold T. Eventoff; Published in The American Society of Mechanical Engineers; Reprinted From: DE–vol. 46 Mechanism Design and Synthesis; Book No. H00772–1992 pp. 211–224.

Primary Examiner—Allan D. Herrmann
Attorney, Agent, or Firm—Ronald Reichman; Melvin J. Scolnick

[57] ABSTRACT

The apparatus of this invention consists of a housing containing 1) a "cam-motor" mechanism 2) an input shaft and 3) an output shaft that may or may not be collinear with the input shaft. The "cam motor" mechanism linking the input and output shafts is capable of an infinite variety of motion transfer functions between the input and output shafts. A "cam-motor" or cam-modulated linkage provides the transfer function. Output motion can be specified to be any of a large variety of displacement profiles (either clockwise and or counter-clock wise) including several dwells and controlled accelerations and decelerations between them. Input motion can also be specified and can have either constant or variable velocity.

8 Claims, 2 Drawing Sheets

MECHANICAL MOTION TRANSFER OR INDEXING DEVICE

CROSS REFERENCE TO RELATED APPLICATIONS

Reference is made to commonly assigned copending patent application Ser. No. 08/410,424 filed herewith entitled "Single Meter Drum And Shutter Bar Drive Of A Postage Meter" in the name of Arnold Eventoff.

FIELD OF THE INVENTION

The invention relates generally to the field of linkage devices or mechanisms and more particularly to a device that is capable of transferring motion between input and output shafts.

BACKGROUND OF THE INVENTION

When a set of rigid or flexible bodies are joined together by means of pins or other kinematic joints a linkage is established. Linkages are used to transmit power and information. They also may be employed to make a point on the linkage follow a prescribed path. Linkages are also used to produce an angular or linear displacement.

Often one wants a machine to move, stop, do something and move again. Servomechanisms have been developed that perform the above. However, servomechanisms are relatively expensive. Numerous devices have been developed to cause intermittent motion providing an indexing function. For example, Geneva mechanisms have been developed and meet the above need to a limited extent. The following references Geneva mechanisms, but similar comparisons can be made with a variety of indexing and motion transfer devices.

A Geneva mechanism is a type of linkage that locks an output shaft at particular angular orientations. Between the locking times the output shaft will rotate. Typically, a Geneva mechanism consists of a driver wheel and a driven wheel receiving one increment of motion for each revolution of the driver. The driver wheel contains a pin or roller while the driven wheel contains three or more equally spaced radial slots. As the driver wheel rotates, the pin attached to the driver wheel engages a slot on the driven wheel and rotates the driven wheel one increment of motion. After the pin leaves the slot, the driven wheel remains locked until the driver pin enters the next slot on the driven wheel. Thus, the constantly rotating driver wheel produces intermittent rotation in the driven wheel.

Geneva mechanisms are very useful for low speed applications where equal increments of motion are required. However, Geneva mechanisms produce jerk (the first derivative of acceleration) which causes an impact force.

Another disadvantage of Geneva mechanisms is that Geneva mechanisms can experience backlash because of the clearance required between pins and slots.

Hence, Geneva mechanisms are not practical at high speeds.

A further disadvantage of Geneva mechanisms is that they are limited to producing certain types of motion e.g., motions are generally modified harmonic in nature and are a function of pin and slot geometry. Also, since the radial slots must be equally spaced only equal increments of angular displacement take place.

SUMMARY OF THE INVENTION

This invention overcomes the disadvantages of the prior art in several is ways. Complex motions can be obtained from a very simple input motion providing flexibility to improve functionality while reducing cost in a variety of potential applications.

For devices where mechanical indexing is required, this invention provides higher quality motion than conventional devices, resulting in a quieter, smoother, and more reliable operation (especially at higher speeds). Also, there is no limitation on the amplitude and profile of indexed displacements e.g., adjacent motions do not have to have equal displacements. Furthermore, there is no limitation on the direction of output motion. Adjacent output motion profiles can have clockwise or counter-clockwise motion. Great flexibility exists for many uses.

For devices where a specific motion profile is required, with or without pauses in motion, the apparatus of this invention can be synthesized to provide a large variety of desired output motion for a given input motion.

The apparatus of this invention consists of a housing containing 1) a "cam-motor" mechanism 2) an input shaft and 3) an output shaft that may or may not be collinear with the input shaft. The "cam motor" mechanism linking the input and output shafts is capable of an infinite variety of motion transfer functions between the input and output shafts. A "cam-motor" or cam-modulated linkage provides the transfer function. This "cam-motor" can simulate the behavior of a servomotor or other open or closed-loop motor control system.

The cam-motor consists of an output link kinematically suspended to have two degrees of freedom in the x-y plane. One end of this link has a hole that is part of a revolute joint connecting it to a gear or wheel fixed to an output shaft. This output link has two cam followers fastened to it orthogonally positioned around a camshaft. Two cams translate the two followers in such a way that perfectly circular motion is imparted to the revolute joint connecting this link to s the output shaft. By deriving the shapes of the two cams, virtually any rotational motion can be given to the output shaft for a given camshaft motion profile. This assemblage of parts comprises the "cam-motor" mechanism.

Output motion can be specified to be any of a large variety of displacement profiles (either clockwise and/or counter-clockwise) and can include several dwells and controlled accelerations and decelerations between them. Input motion can also be specified and can be either continuous rotation or motion having variable velocity.

The cam motor mechanism may have various configurations which provide a user-definable output shaft motion profile given an input shaft velocity that can be constant or variable. The apparatus of this invention can be designed as an indexing mechanism having user-specified motion between dwells, or it can be configured to provide virtually any combination of clockwise and/or counter-clockwise output motion profiles for a repeatable input motion cycle.

The apparatus of this invention may be used in a wide variety of applications e.g. processing equipment and automation machinery.

An advantage of this invention is that the apparatus of the invention can be designed to eliminate backlash and jerk.

An additional advantage of this invention is that the apparatus of this invention is capable of producing many different types of output motions from relatively simple input motions.

DETAILED DESCRIPTION OF THE PREFERRED EMBODIMENT

Figure 1:
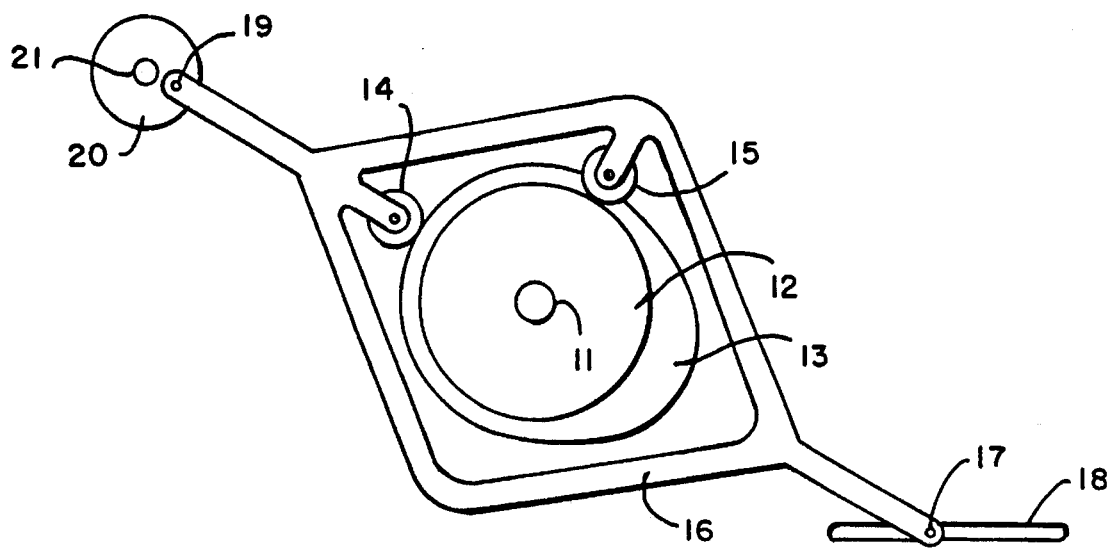
FIG. 1 is a drawing of the apparatus of this invention having non-collinear input and output shafts.

Referring now to the drawings in detail, and more particularly to FIG. 1, the reference character 11 represents an input shaft. Input shaft 11 also serves as a camshaft and hence is coupled to cams 12 and 13. Cam 12 operates cam follower 15 and cam 13 operates cam follower 14. Cam followers 14 and 15 are fastened to output link 16. It would be obvious to one skilled in the art of cam design that various means may be utilized to insure that cam followers remain on the surfaces of their respective cams. For example, 1) a spring strategically placed between the output link 16 and ground or, 2) two additional conjugate cams having mating (spring loaded) cam followers also mounted to the output link.

A pin 17 is connected to output link 16. Pin 17 engages grounded slot 18, which is at an appropriate angular orientation. A revolute joint 19 connects output wheel 20 to output link 16. An output shaft 21 is concentrically fixed to output wheel 20.

Cams 12 and 13 must be shaped to provide a) in the xy space domain: that revolute joint 19 moves in a perfectly circular path to insure that joint 19 provides rotary motion to output wheel 20; and b) in the time domain: the specified angular positions of output wheel 20 as a function of time are obtained. In addition the shapes of cams 12 and 13 are dependent upon the time dependent angular position of input shaft 11. There are several methods in which cams 12 and 13 may be specially shaped for particular purposes. An example of one method is described in "Automated Cam-Mechanism Synthesis and Analysis", by the inventor hereof, The American Society of Mechanical Engineers, DE-Vol 64 1992 incorporated herein by reference.

Figure 2:
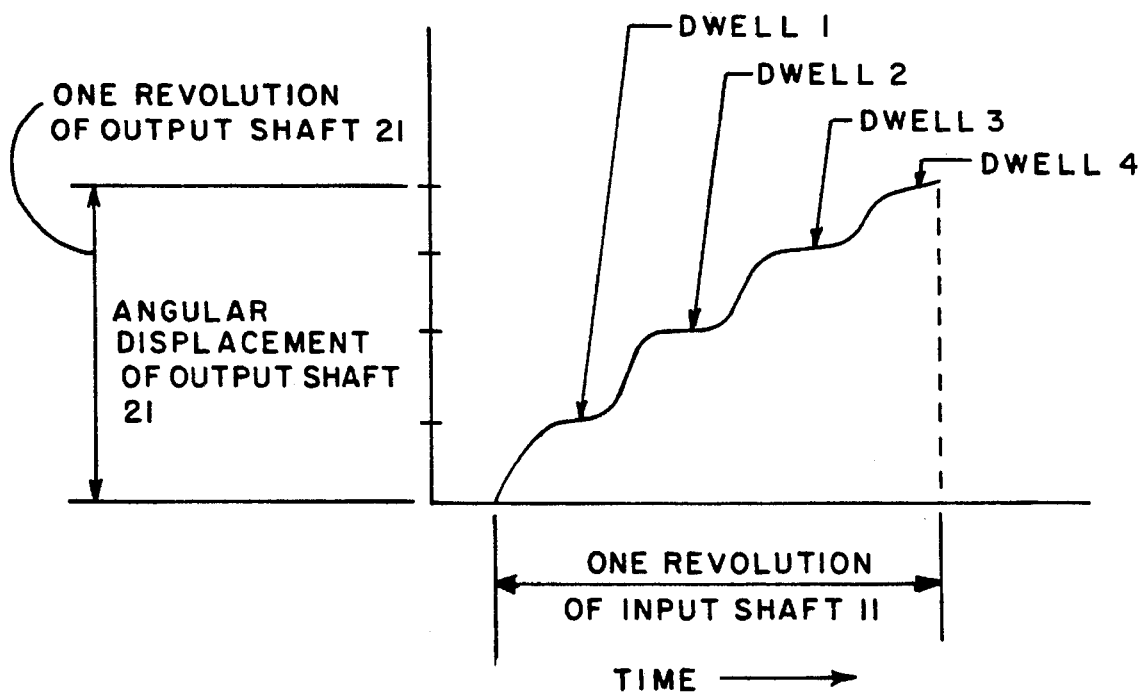
FIG. 2 is a timing diagram of the output shaft 21 motion vs. input shaft 11 motion for one revolution of input shaft 11 of FIG. 1.

FIG. 2 is one example of a possible timing diagram of output shaft 21 vs, input shaft 11 for one revolution of input shaft 11 of FIG. 1, for relatively simple indexing motion. For one revolution of input shaft 11, output shaft 21 completes one revolution but experiences four periods of movement and four periods of dwell.

The above diagram shows relatively equal increments of motion and relatively equal dwells. In this simple example input shaft 11 has a constant velocity. However, those skilled in the art can specify any convenient dwell time and any convenient displacement profile between dwells i.e., higher order polynomial motion can be specified to completely eliminate jerk for any or all motions between dwells, or lower quality motion (e.g. cycoidal or harmonic) cycoidal motion can be specified yielding finite (or infinite) jerk, but having the benefit of lower peak accelerations for any or all motion profiles. Because cam shapes 12 and 13 are derived as a function of desired output motions as well as the specified input motion or shaft 11, many combinations of output motions are possible. If a more complex camshaft motion is required, the cam shapes would account for this variation while preserving the desired output using the cam shaping method described hereinbefore.

Figure 3:
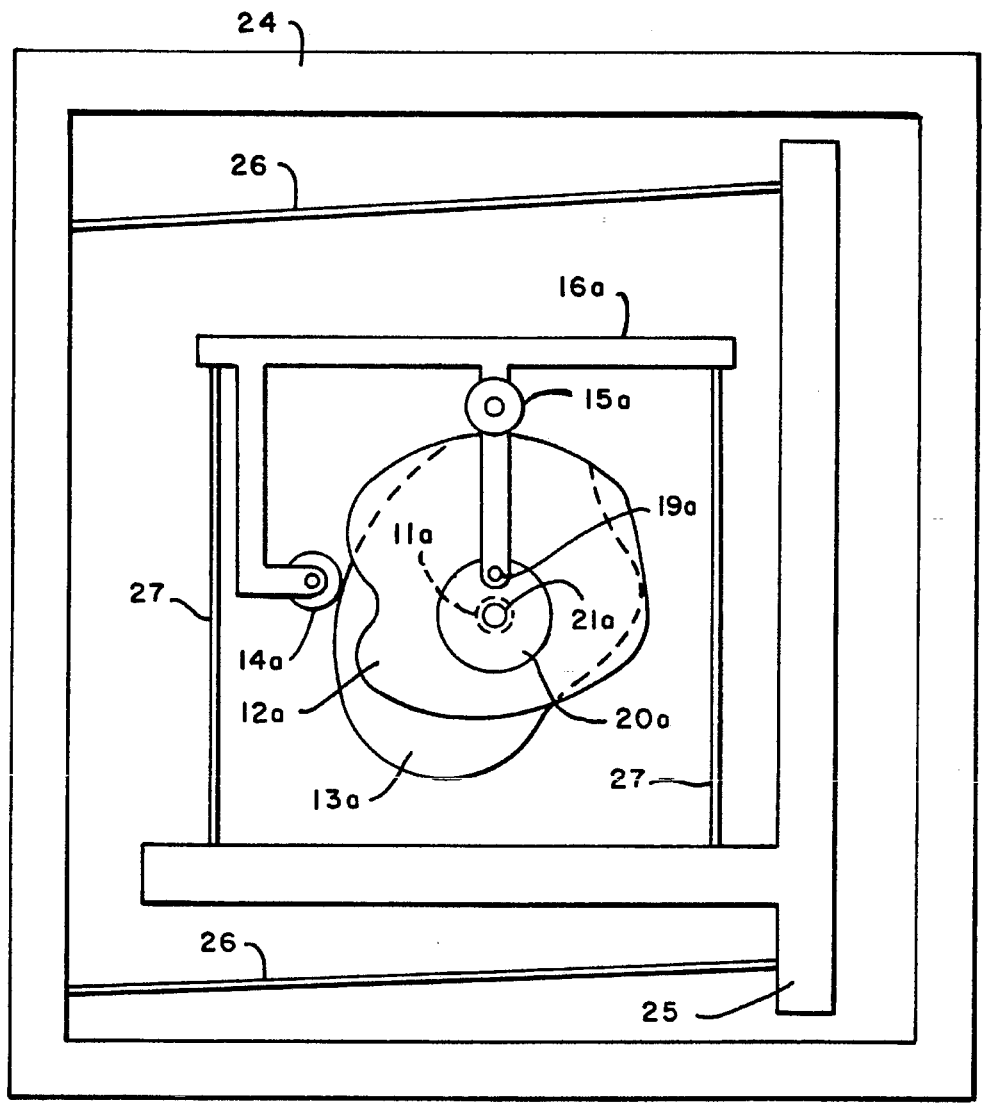
FIG. 3 is a drawing of the apparatus of this invention having collinear input and output shafts.

FIG. 3 is a drawing of the apparatus of this invention having collinear input and output shafts. Input shaft 11a also serves as a cam shaft. Input shaft 11a is coupled to cams 12a and 13a. Cam 12a operates cam follower 15a and cam 13a operates cam follower 14a. Cam followers 14a and 15a are coupled to output link 16a. It would be obvious to one skilled in the art of cam design that various means may be utilized to insure that cam followers respectfully remain on the surfaces of cams. For example a spring strategically placed between the output link 16a and ground or two additional conjugate cams having mating (spring loaded) cam followers also mounted to the output link. Output link 16a is coupled to output wheel 20a by revolute joint 19a, or any known fastening means.

An output shaft 21a is concentricity fixed to output wheel 20a. Cams 12a and 13a must be shaped to provide a) in the xy space domain that revolute joint 19a moves in a perfectly circular path to insure that joint 19a provides rotary motion to output wheel 20a; and b) in the time domain the specified angular positions of output wheel 20a as a function of time are obtained. In addition the shapes of cams 12a and 13a are dependent upon the time dependent angular position of input shaft 11a. There are several methods in which cams 12a and 13a may be specially shaped for particular purposes. An example of one method is described in "Automated Cam-Mechanism Synthesis and Analysis", by the inventor hereof, The American Society of Mechanical Engineers, DE-Vol 64 1992, herein incorporated by reference.

Each flexure of flexure pair 26 may have the same length.

Flexure pair 26 is coupled to output carrier link 25 and housing 24. Housing 24 is stationary in order to provide frictionless parallel motion in essentially the vertical direction to output carrier link 25. Each flexure of flexure pair 27 may have the same length. Flexure pair 27 connects output link 16a to output carrier link 25 and provides parallel motion in essentially a horizontal direction to output link 16a relative to output carrier link 25. The foregoing arrangement maintains parallelism between output link 16a and stationary housing 24 and allows it to have two degrees of freedom in the X-Y plane.

An advantage of flexure pairs 26 and 27 is that they provide frictionless suspension to supported members. A further advantage is that flexure pairs 26 and 27 can be designed to provide a spring loaded biasing force between cam followers 14a and 15a and respective cams 13a and 12a. Thereby, insuring that cam followers 14a and 15a remain on cam surfaces 13a and 12a thereby, eliminating backlash. With the above arrangement additional cam follower springs would not be necessary.

It would be obvious to one skilled in the art that circular motion at joint 19a may be obtained by numerous forms of cam modulated linkages. For example, a different embodiment of FIG. 3 may have four bar linkages instead of flexure pairs 26. Furthermore, output link 16a need not maintain parallel motion to accomplish the above. One skilled in the art would be able to develop several varieties of cam modulated linkages not limited to parallel motion.

Figure 4:
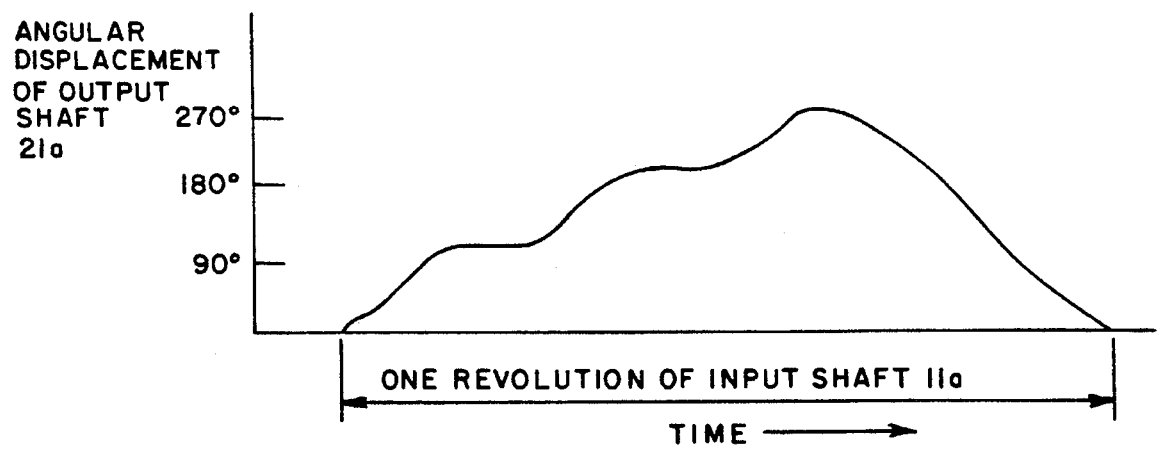
FIG. 4 is a timing diagram of output shaft 21a motion vs. input shaft 11a motion.

FIG. 4 is a timing diagram of output shaft 21a motion vs. input shaft 11a motion of FIG. 3. Input shaft 11a and output shaft 21a are shown at rest at a home dwell. The first movement of input shaft 11a causes an angular movement of 90 degrees by output shaft 21a and a first dwell. The second movement of input shaft 11a causes output shaft 21a to rotate to 180 degrees and the second dwell. The third movement of input shaft 11a causes output shaft 21a to rotate to 270 degrees the maximum amplitude it experiences in a counter-clock wise direction where it immediately reverses direction and is displaced clockwise back to its home position. The shapes shown on cams 12a and 13a have been synthesized to satisfy the above mentioned motion profile. It would be obvious to one skilled in the art that cams 12a and 13a may be specifically shaped to provide numerous varieties of output motion profiles.

The above specification describes a new and improved mechanical motion transfer or indexing device. It is realized that the above description may indicate to those skilled in the art additional ways in which the principles of this invention may be used without departing from the spirit. It is, therefore, intended that this invention be limited only by the scope of the appended claims.

What is claimed is:

1. A linkage device for coupling an input shaft with an output shaft, said device comprising:

a first cam that is coupled to a first cam follower, said first cam is connected to the input shaft;

a second cam that is coupled to a second cam follower, said second cam is connected to the input shaft; and a output link that is connected to said first and second cam followers and the output shaft, said first and second cams are shaped to force said output link to trace out a circular path causing said output link to rotate the output shaft.

2. The linkage device claimed in claim 1, wherein said first and second cams are shaped to provide specific time dependent displacement profiles for the output shaft given a specific input shaft motion.

3. The linkage device claimed in claim 1, wherein the input and output shafts are not collinear.

4. The linkage device claimed in claim 1, wherein the input and output shafts are collinear.

5. The linkage device claimed in claim 1, further including:

a housing containing the linkage device;

a output carrier link;

a first pair of flexures that is connected to said output carrier link and said housing; and a second pair of flexures that is connected to said output carrier link to provide a frictionless suspension to the output link.

6. The linkage device claimed in claim 5, wherein each flexure in said first pair of flexures has the same length and each flexure in said second pair of flexures has the same length in order to supply parallel motion to the output link.

7. The linkage device claimed in claim 5, wherein said first and second pair of flexures provide a biasing force to insure said first follower is always in contact with said first cam and said second follower is always in contact with said second cam.

8. The linkage device claimed in claim 1, further including:

a grounded member connect to the linkage device;

a output carrier link;

a first pair of flexures that is connected to said output carrier link and said grounded member; and a second pair of flexures that is connected to said output carrier link to provide a frictionless suspension to the output link.

\* \* \* \* \*